April 19, 1949. F. A. MARIS 2,467,982
VALVE PULLER
Filed July 6, 1945 2 Sheets-Sheet 2
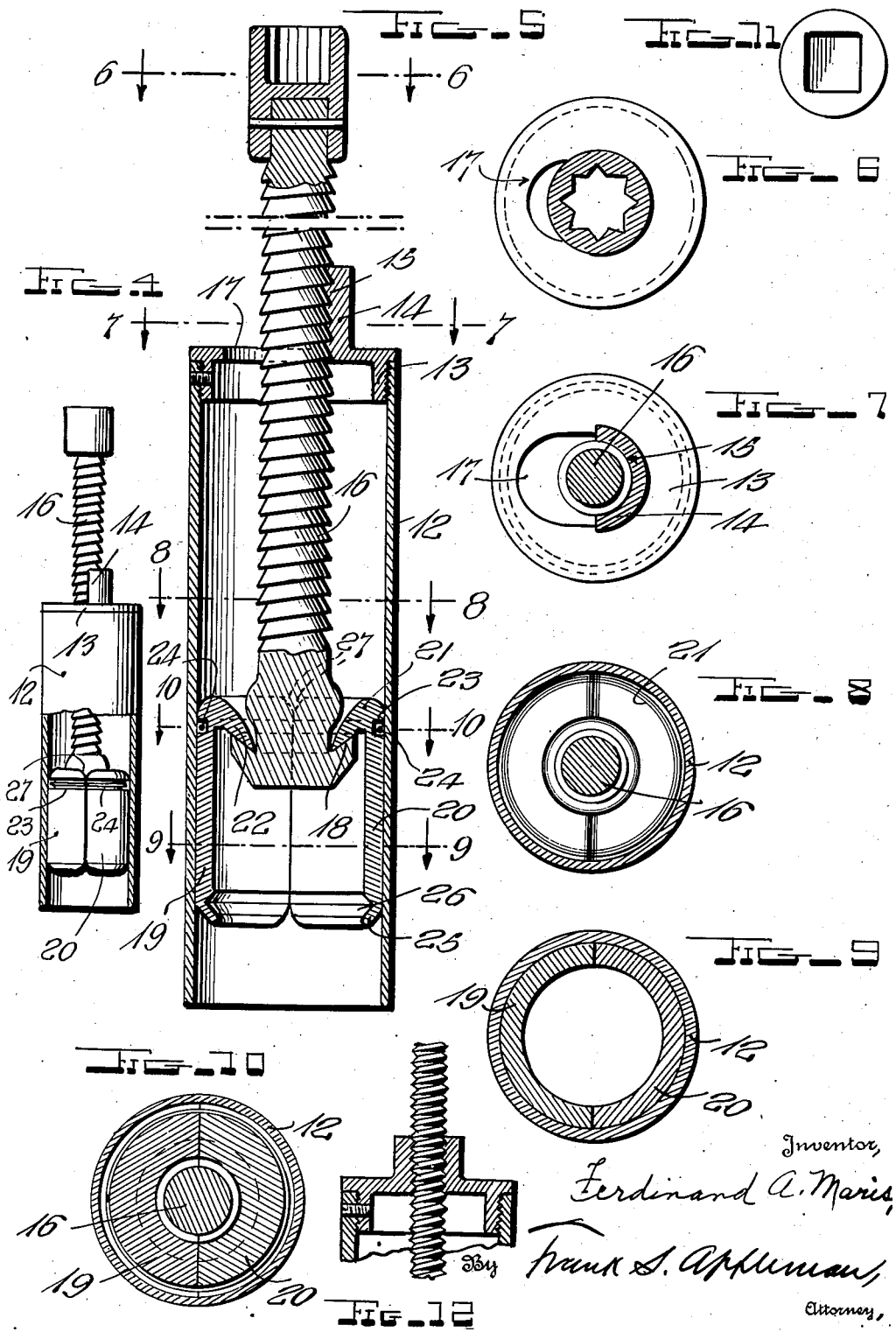
Inventor,
Ferdinand A. Maris,
By Frank S. Appleman,
Attorney, Patented Apr. 19, 1949

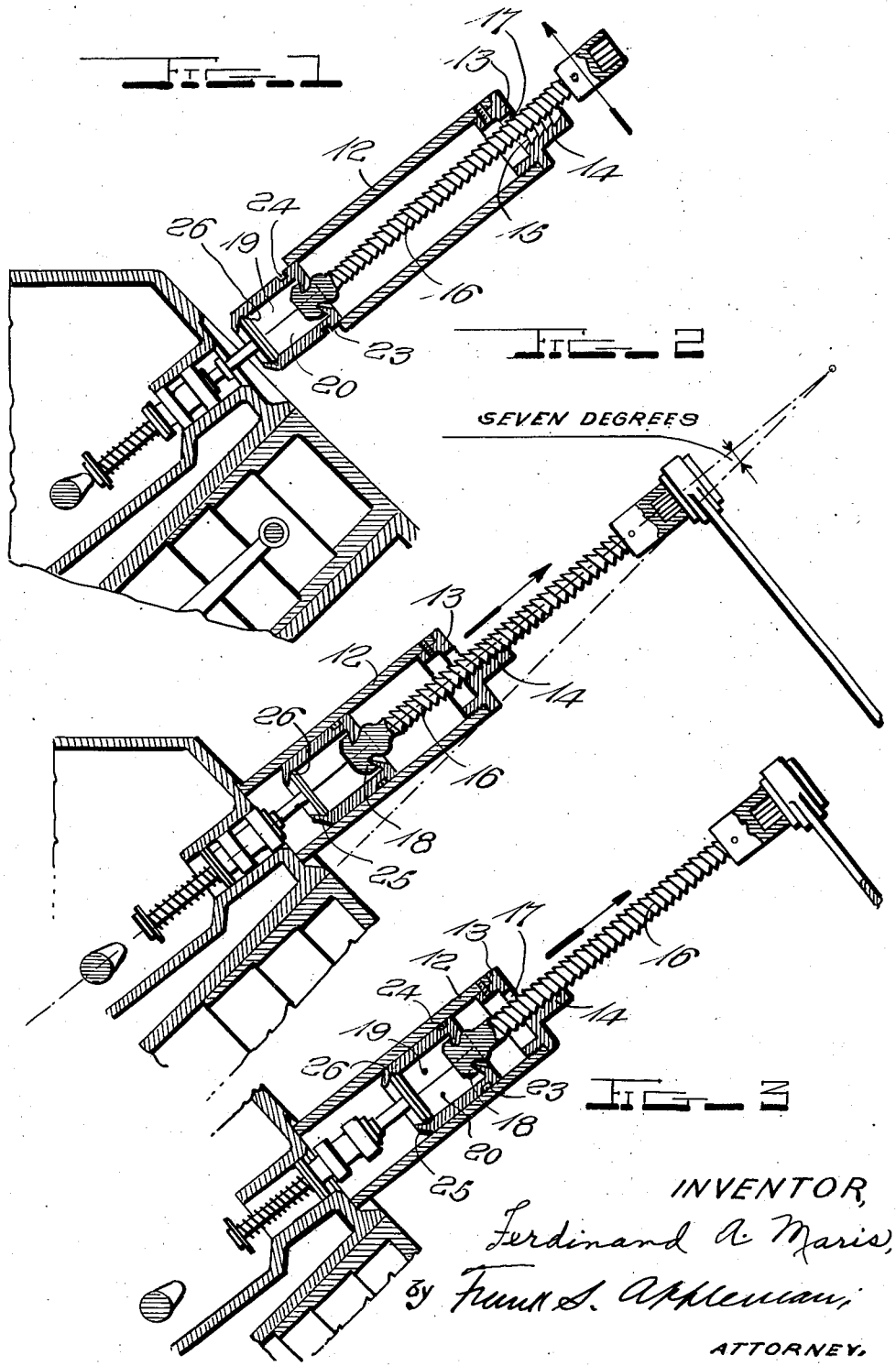

2,467,982

UNITED STATES PATENT OFFICE 2,467,982

VALVE PULLER

Ferdinand A. Maris, Sutter County, near Live Oak, Calif., assignor of three-fourths to Frank Morgan Application July 6, 1945, Serial No. 603,457

3 Claims. (Cl. 29—214)

This invention relates to valve pullers or valve guide pullers, or valve and guide assembly pullers, and has special reference to a mechanism for removing valve assemblies of the "Ford" type, though the inventor does not wish to be restricted to its use wherever it should be available.

It is furthermore the purpose of the inventor to provide undercut threads on the screw and overcut threads on a half nut for engaging the screw to prevent disengagement of the screw and half nut during the pulling process, and the purpose of the half nut, as will presently appear, is to speed the adjustment of the screw by disengagement of the screw and nut after the valve assembly is pulled.

There are many different methods in vogue for removing valves, but many of them result in injury to the valve stem or damage the valve head or motor block, but is is believed unnecessary to recite the different shop or operative methods which are old, it being sufficient to indicate the purposes of the improvement afforded by the invention.

It is an object of the valve puller forming the subject of this application to provide novel jaws for engaging the valve to be operated, and a sleeve with relation to which the jaws reciprocate, which sleeve serves to retain the jaws in engagement with the valve as the jaws are moved longitudinally of the sleeve for pulling the valve; and it is furthermore an object to provide a screw having a novel joint by which it is connected to the jaws, effective to prevent binding of the jaws when in contact with the inner wall of the sleeve.

It is furthermore an object of the invention to provide a novel combination of the screw and a half nut engaged thereby, and means for facilitating the disengagement of the screw and nut to permit the jaws to be moved independently of the action of the screw and nut, the said assembly permitting disengagement of these elements in order that the jaws may be reciprocated by pressure longitudinally of the screw for the purpose of acquiring a quick adjustment of the jaws with relation to the valve.

It is a still further object of the invention to provide sectional jaws which may be expanded or separated at their ends to embrace the valve while retaining the sections of the jaws assembled, and it is shown that the screw is provided with a socket to receive a manually operated instrument for rotating the screw.

In constructing the sleeve and the jaws, certain over all dimensions must be observed and followed in order that the end of the sleeve bearing on the motor block will rest on the outer edge of the valve seat of the valve to be pulled, but of course the sleeve must be of a size to clear the head of the valve so that the instrument assumes the angle of the stem of the valve, which stem is necessarily at right angles to the seat of the valve, but not necessarily at right angles to the top of the block.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a sectional view of a portion of a motor block of the V-type with the exhaust valve manifold removed and the valve puller in engagement with the valve prior to the time that the sleeve is seated in the recess of the motor block;

Figure 2 illustrates the same parts when in the initial step of operating the puller in removing the valve;

Figure 3 illustrates a similar view showing an advanced step in the operation, in which the valve and the assembly is being dislodged from the motor block;

Figure 4 illustrates a view in elevation, partly in section, of the elements of the puller;

Figure 5 illustrates an enlarged sectional view thereof;

Figure 6 illustrates a sectional view on the line 6—6 of Fig. 5;

Figure 7 illustrates a sectional view on the line 7—7 of Fig. 5;

Figure 8 illustrates a sectional view on the line 8—8 of Fig. 5;

Figure 9 illustrates a sectional view on the line 9—9 of Fig. 5;

Figure 10 illustrates a sectional view on the line 10—10 of Fig. 5;

Figure 11 illustrates a sectional view showing a modified tool socket for turning the screw; and Figure 12 illustrates a sectional view showing the screw and modified nut assembly with conventional forms of threads.

In these drawings 12 denotes a sleeve of the valve puller having a flanged head plate 13 lodged in its outer end and preferably threaded in place so that it may be removed expeditiously. The plate has an upstanding flange 14 curved and internally threaded as at 15, to form a half nut with relation to which the threads of a screw 16 coact. The head plate is provided with a slot 17 opposite the half nut and is intended to form a clearance so that the screw may be moved laterally with its threads out of engagement with the half nut when the screw is to be moved axially by pushing or pulling the same longitudinally for the purpose of positioning the jaws with respect to the valve.

The lower end of the screw has an annular recess, the upper wall 18 of which recess is beveled and it is flared from its junction with the screw to the outer edge thereof. The jaws, in the present embodiment of the invention, comprise two sections 19 and 20 and as these jaws are of identical construction, a description of one of them will suffice for an understanding of their construction and coactive relation with the screw. The head 21 of each jaw has a depending flange 22, the inner surface of which is beveled to the angle of the wall 18 of the recess in the end of the screw and, as the screw is moved, these beveled surfaces tend to tilt or cant the jaws to an extent that will prevent their binding against the inner wall of the sleeve.

The heads have slots or recesses such as 23 in their external surfaces and a spring 24 which embraces the heads of the jaws serves to hold them assembled with relation to their coacting elements. The outer ends of the jaws are beveled, as at 25, and the inner wall of each jaw has a V-shaped seat 26 of the general form of the edge of a valve to be engaged by them.

The corners of the heads above the spring 24 are cut away or beveled, as at 27, which permits the jaws to separate at their lower ends to a degree necessary for their application to the valve, for of course the ends of the jaws must pass the edge of the valve and then move towards each other to firmly embrace and engage the valve.

It is shown that the threads of the screw are undercut, whereas the threads of the nut are overcut, and in releasing the screw from the nut, the screw should be backed or retracted approximately a half turn to free the engaging surfaces of the threads to permit the screw to be moved laterally.

As shown in Figure 11, the socket for receiving a part of the speed wrench is square, whereas the form of the socket of another type is shown in Figure 6, and the inventor does not wish to be limited with respect to the type of speed wrench to be employed in the operation of the puller. In Figure 12, a modified screw and nut assembly is illustrated, though the most effective and expeditious arrangement is that illustrated in the preferred form of the invention.

From the foregoing description, it will be apparent that in operating the valve puller, the usual valve guide retainer which is a part of the valve assembly must be removed and the engine cam shaft rotated to open the valve to enable the valve head to be seated in the V-shaped grooves 26 of the jaws and the sleeve moved so that it rests on the engine block. Preferably, the sleeve has a diameter slightly greater than the diameter of the valve which is to be removed and as the engine blocks of different types are differently contoured around the valve seat, the end of the sleeve which engages the block may be contoured to insure a firm abutment of the edge of the sleeve with the contoured surface of the engine block around the valve, though in most instances a straight surface edge of the sleeve will operate in conjunction with the engine blocks now in common use. During this adjustment, the screw is moved out of engagement with the half nut in the manner described, and after the said adjustment the screw is moved back into engagement with the threads of the half nut and the screw is turned to withdraw the valve assembly. When the assembly is clear of the block, the wrench which has been used in turning the screw is turned back a half turn or more to release pressure on the threads and the screw may then be moved sidewise in the slot 17 into a free position so that the screw can be dropped to free the jaws from the sleeve to a sufficient degree as will permit movement of the jaws to release the valve, and the operation can then be repeated on another valve assembly.

I claim:

1. In a valve puller, a sleeve having a head with an upstanding curved flange and a lateral slot in said head opposite the flange, the said flange having threads on its inner surface forming a sectional nut, a screw having a wrench-engaging outer end engaging the threads of the nut and movable laterally in the slot for disengagement therewith, the said screw having an annular recess near its inner end with a beveled outwardly flared surface, sectional jaws in the sleeve, each having a head with a depending flange contacting the wall of the recess and having a beveled surface approximately corresponding to the wall of the recess whereby the screw is oscillatively connected to the head, said jaws having valve-engaging internal surfaces at their ends opposite the screw, and means for yieldingly holding the jaws assembled with relation to the screw.

2. In a valve puller, a sleeve having a head with an upstanding curved flange and a lateral slot in said head opposite the flange, the said flange having overcut threads on its inner surface forming a sectional nut, a suitably rotated screw having undercut threads engaging the threads of the nut and movable laterally in the slot for disengagement therewith, the said screw having an annular recess near its inner end with a beveled outwardly flared surface, sectional jaws in the sleeve each having a head with a depending flange contacting the wall of the recess and having a beveled surface approximately corresponding to the wall of the recess which they engage, said jaws having valve-engaging internal surfaces at their ends opposite the screw, and means for yieldingly holding the jaws assembled with relation to the screw.

3. In a valve puller, a sleeve having a head with an upstanding curved flange and a lateral slot in the said head opposite the flange, the outer end of the sleeve being shaped to engage a surface of an engine block bordering a valve in the said block, the said flange having threads on its inner surface forming a sectional nut, a suitably rotated screw engaging the threads of the nut and movable laterally in the slot for disengagement therewith, the said screw having an annular recess near its inner end with a beveled outwardly flared surface, sectional jaws in the sleeve each having a head with a depending flange contacting the wall of the recess and having a beveled surface approximately corresponding to the wall of the recess which they engage, said jaws having beveled outer edges which permit the lower ends of the jaws to move outwardly while the beveled surfaces act as fulcrums on which the jaws move, said jaws having valve-engaging internal surfaces at their ends opposite the screw, and means for yieldingly holding the jaws assembled with relation to the screw.

FERDINAND A. MARIS.

REFERENCES CITED

The following references are of record in the file of this patent:

UNITED STATES PATENTS

| Number | Name | Date |
|---|---|---|
| 192,734 | Broadbent | July 3, 1877 |
| 229,325 | Luther | June 29, 1880 |
| 714,989 | Worthington | Dec. 2, 1902 |
| 1,313,511 | Beach | Aug. 19, 1919 |
| 1,357,698 | Fessenden | Nov. 22, 1920 |
| 1,368,501 | Huddle | Feb. 15, 1921 |
| 1,433,131 | Giddings | Oct. 24, 1922 |
| 1,644,839 | Landrum | Oct. 11, 1927 |
| 1,783,649 | Howell | Dec. 2, 1930 |
| 1,858,238 | Cornwell | May 17, 1932 |
| 2,022,549 | Skelton | Nov. 26, 1935 |
| 2,050,005 | Heegeman | Aug. 4, 1936 |
| 2,133,892 | Gelinski | Oct. 18, 1938 |
| 2,137,573 | Kamenarovic | Nov. 22, 1938 |
| 2,174,451 | Strange | Sept. 26, 1939 |
| 2,212,572 | McCarthy et al. | Aug. 27, 1940 |
| 2,318,980 | White | May 11, 1943 |